United States Patent [19]

De Lorenzo et al.

[11] 4,052,997
[45] Oct. 11, 1977

[54] LEAK DETECTION ARRANGEMENT FOR VALVE HAVING SEALING MEANS

[76] Inventors: Bruce L. De Lorenzo; Daniel J. McCarthy, both of P.O. Box 72, Clifton, N.J. 07015

[21] Appl. No.: 624,199

[22] Filed: Oct. 20, 1975

Related U.S. Application Data

[63] Continuation of Ser. No. 309,903, Nov. 27, 1972, abandoned.

[51] Int. Cl.² .......................................... F16K 31/06
[52] U.S. Cl. ................................................ 137/312
[58] Field of Search ............... 137/312, 314; 251/141, 251/214, 335 R, 335 A, 335 B; 277/2, 29, 42, 59; 73/46; 340/242

[56] References Cited

U.S. PATENT DOCUMENTS

| | | | |
|---|---|---|---|
| 323,404 | 8/1885 | Durfee | 137/312 X |
| 2,031,478 | 2/1936 | Gray | 251/335 A X |
| 2,934,090 | 4/1960 | Kenann et al. | 137/312 X |
| 3,319,647 | 5/1967 | Morain | 137/312 |
| 3,354,897 | 11/1967 | Koch et al. | 137/312 |

*Primary Examiner*—Martin P. Schwadron
*Assistant Examiner*—Richard Gerard
*Attorney, Agent, or Firm*—Arthur A. March

[57] ABSTRACT

A valve includes a plunger which is movable by actuating means such as a solenoid coil, air pressure or other means to move a valve member toward and away from a valve seat. The fluid flow area of the valve is sealed from the actuating means by the diaphragm, O-rings or other forms of sealing structure. In order to insure against leakage past the diaphragm or seal and especially against leakage into the actuating means, the construction includes another diaphragm or seal spaced from the first seal providing a seal space between the first and second diaphragms or seals. In the event of leakage past the first sealing means, flow of the liquid into the space between the first and second sealing means causes an outward flow of the fluid through a detecting passage which thereby provides means which disclose the leakage past the first sealing means so that the first sealing means can be immediately replaced before any damage to the actuating means or to the system itself.

4 Claims, 7 Drawing Figures

LEAK DETECTION ARRANGEMENT FOR VALVE HAVING SEALING MEANS

This is a continuation of copending parent application Ser. No 309,903, filed Nov. 27, 1972, and now abandoned.

BACKGROUND OF THE INVENTION

This invention relates in general to the construction of valves and, in particular, to a new and useful device for detecting leakage past a diaphragm or seal of a solenoid, air driven or other type valve in order to prevent damage to the actuating means.

DESCRIPTION OF THE PRIOR ART

Prior to the present invention, it was known to provide a valve with a diaphragm which seals in order to prevent any liquid from entering into the actuating area and into the electrical coil for energizing the solenoid. The disadvantage of the construction of such valves is that when the diaphragm begins to wear and leakage develops, such leakage is not detected before damage has been done to the actuator itself. As a consequence, costly replacement of the solenoid was necessary. Also, system failure could occur in addition to valve failure.

SUMMARY OF THE INVENTION

In accordance with the present invention, the valve includes two diaphragms or seals which are located at spaced axial locations in order to seal a space which is connected to the atmosphere through a leak detection passage. With the construction, any leakage past the first diaphragm or seal will move outwardly through the detection passage and be readily visible. This provides a direct indication that the first diaphragm is leaking and that it needs to be replaced. The replacement of the diaphragm is easy and simple and thus considerable damage to the valve and system is avoided.

Accordingly, it is an object of the invention to provide a sealed valve construction which includes a seal space in proximity to the sealing means which is communicated to the exterior so that any leakage past the sealing means is immediately detectable and correctable.

A further object of the invention is to provide a valve construction with leakage detection means and which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE INVENTION

Figure 1:
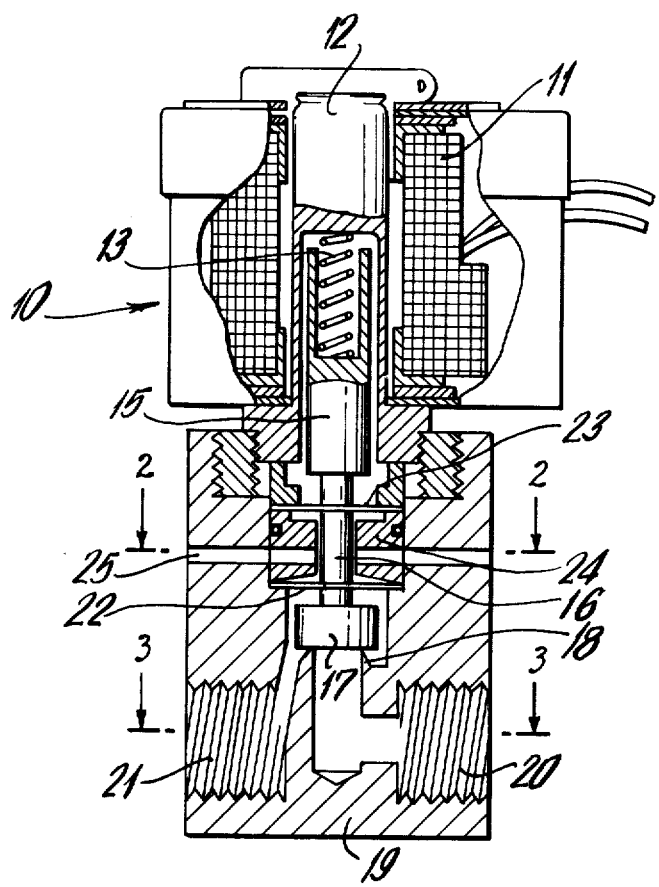
FIG. 1 is a vertical sectional view of a solenoid valve constructed in accordance with the invention.
Figure 2:
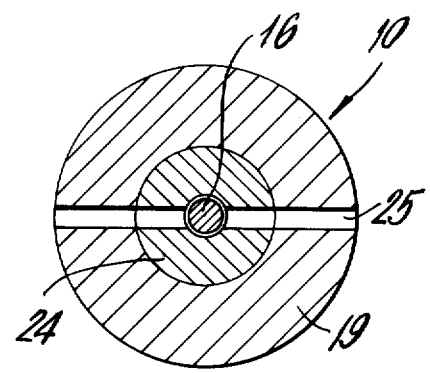
FIG. 2 is a section taken along the line 2—2 of FIG. 1.
Figure 3:
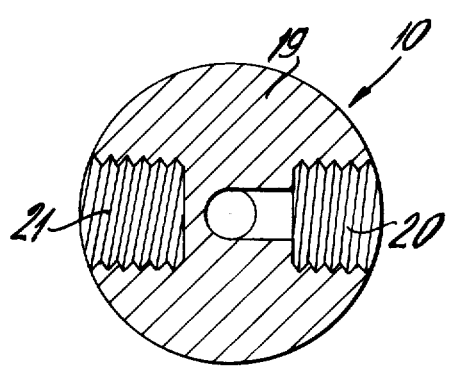
FIG. 3 is a section taken along the line 3—3 of FIG. 1.

Referring to the drawings in the form shown in FIGS. 1 - 3, there is shown therein an actuating means in the form of a solenoid valve which is generally designated by the numeral 10. The valve includes the usual solenoid coil 11, which is disposed around a solenoid core tube 12. The tube has a spring 13, which is in biased relation between the tube 12 and a solenoid plunger 15. The plunger 15 reciprocates in the core tube 12 carrying with it an extension or piston 16. At the lower end of the piston is a valve member 17. The construction is such that the valve member moves toward and away from a valve seat 18. The seat is located within the valve body 19 and between inlet passage 20 and outlet passage 21. The space above the inlet passage 20 which surrounds the valve member 17 and communicates with the outlet passage 21, is sealed by a diaphragm 22. The diaphragm peripherally engages the body 19 at its outer circumference and also engages the extension 16 at its inner circumference. Thus, the flow of liquid between the inlet passage 20 and outlet passage 21 is insured at the appropriate times. The diaphragm 22 is utilized to prevent any passage of said liquid to the solenoid, to attempt to prevent damage thereto. However, such diaphragms have heretofore been known to become worn rather frequently, whereby their function is rendered useless and damage has been done to the expensive solenoid without detection of any leakage, whereupon the solenoid must be replaced.

The present invention provides means whereby damage to the solenoid can be prevented as soon as diaphragm 22 begins to wear. The means are such that the wear of the diaphragm 22 can be detected before any damage to the solenoid itself. In the form shown, these means comprise a second sealing diaphragm 23 which is secured between and peripherally engages the valve body 19. The inner circumference of the diaphragm 23 engages the extension 16. As a consequence, a second leakproof area is provided. The diaphragm 23 is disposed in a spaced relation in an axial direction to diaphragm 22. Also located between the diaphragms 23 and 22 is a spacer 24. In accordance with the invention a passage 25 is provided from the interior of the spacer 24 through the valve body 19. As a consequence, it will be noted that if the diaphragm 22 is in any way damaged through wear or otherwise, the liquid flowing from inlet 20 will bypass this diaphragm 22. However, such liquid flow will not damage the solenoid 10 in any way, as flow to the solenoid will be prevented by diaphragm 23. In the meantime, damage to the diaphragm 22 can be detected by the flow of such liquid out through the port or passage 25, which will flow to the exterior of the body 19. Thus, immediate detection of damage to the diaphragm 22 is possible by visual inspection. When the flow is visible at the exterior of the passage 25, it is a sign that the first diaphragm 22 needs replacement and this can be easily and quickly done before any major damage is done to the solenoid by a flow of liquid upwardly into the solenoid core tube 11.

The passage 29 may be connected to any means for transporting the liquid leaking through the passage to a remote location.

Thus, the invention provides an easy and simple manner for detecting leakage of the diaphragm 22 of a solenoid valve 10 so that it can be replaced before any leakage beyond the extension 16 of the solenoid plunger occurs.

Figure 4:
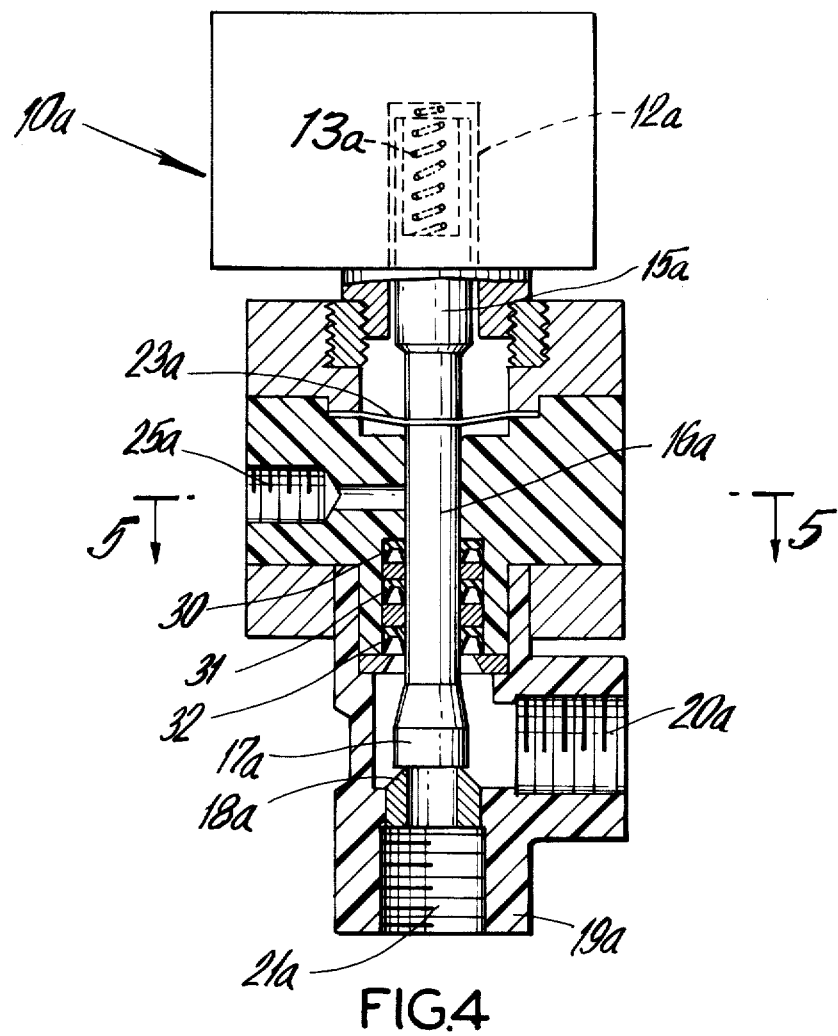
FIG. 4 is a vertical sectional view of a modified form of a solenoid valve constructed in accordance with the invention.
Figure 5:
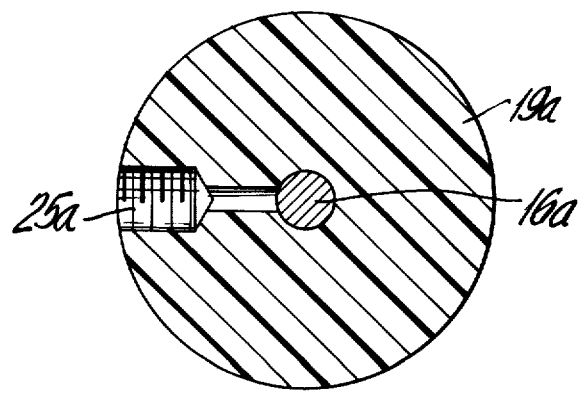
FIG. 5 is a section taken along the line 5—5 of FIG. 4.

FIGS. 4 and 5 show a valve in which the inlet passage 20a and outlet passage 21a are located correspondingly above and below the valve seat 18a. This form is particularly beneficial when high flow rates and high pressures are encountered. In view of the fact that the fluid passes through the inlet above the valve seat 18a the pressure rating is difficult to obtain with a large flat diaphragm and another arrangement as hereinafter described is disclosed.

In this construction a solenoid 10a which has the conventional solenoid coil (not shown) is disposed around solenoid core tube 12a. A plunger 15a reciprocates as in the case of the embodiment of FIGS. 1 - 3 under the biasing action of spring 13a in the core tube 12a carrying with it an extension or piston 16a. The plunger is preferably made of plastic such as Teflon. A set of seals 30, 31 and 32 are provided through which the plunger 15a passes in order to minimize the area which is affected by the pressure of the flow of liquids through the inlet passage 20a to the outlet passage 21a. The seals 30 - 32 are disposed above the inlet passage 20a and the valve seat 18a.

In the event the seals become amaged or worn a passage 25a is provided below the solenoid 10a. The passage will carry any liquid passing through the sealed area and the fact that the seals 30 - 32 are damaged can be readily detectable by visual inspection. According to the present invention, the escaping fluid cannot cause damage to the solenoid or system by reason of the provision of a seal or diaphragm 23a which prevents the passage of the fluid into the solenoid chamber. It is to be noted that despite the pressure in the system, the diaphragm 23a, because of the arrangement, i.e. the substantially continuous slidable relation between the plunger 15a and the axial bore in the valve which surrounds it above and below passage 25a, is never in contact with any fluid under pressure.

Thus, it may be seen that this modified form of the present invention prevents any damage to the actuator even with high flow rates and high pressure in the valve.

Figure 6:
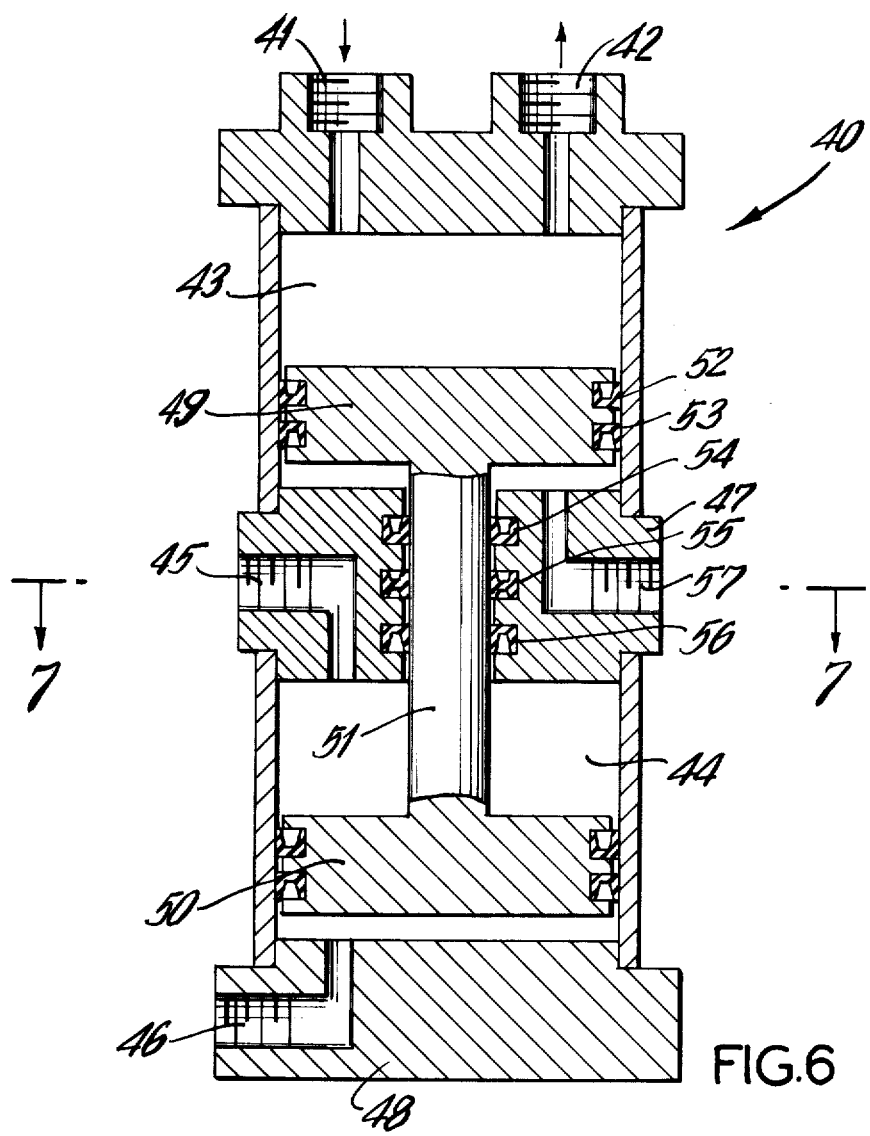
FIG. 6 is a vertical sectional view of still another form of valve, namely, an air pressuring metering valve constructed in accordance with the invention.
Figure 7:
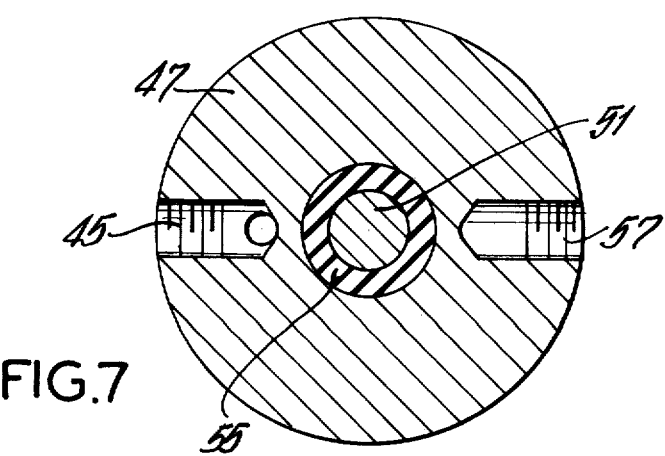
FIG. 7 is a section taken along the lines 7—7 of FIG. 6.

In the form shown in FIGS. 6 and 7 the damage detecting means of the present invention are shown in an air driven metering valve.

As shown the valve 40 is provided with an inlet port 41 and an outlet port 42 for the flow of liquids passing through chamber 43. Air is introduced into air chamber 44 through passages 45 and 46 which act as both the inlet and outlet ports under the conditions hereinafter described. The passages 45 and 46 are located in passage containing valve members 47 and 48 respectively. Reciprocating pistons 49 and 50 are connected to each other by shaft or plunger 51 and are slidably mounted in the valve housing.

Seals 52 and 53 surround the piston 49 normally preventing the liquid in chamber 43 from flowing into the actuating chamber 44. A plurality of seals 54, 55 and 56 surround the shaft or plunger 51 located in valve member 47. A detecting passage 57 is located, as shown, in valve member 47.

In operation of the valve, a measured, predetermined amount of liquid flows into chamber 43 through inlet 41. The pistons 49 and 50 are located adjacent their respective valve members 47 and 48 during this time, that is in the liquid filling position shown in FIG. 6. When chamber 43 is filled with the desired amount of liquid, air under pressure is introduced into chamber 44 through inlet 46. This action moves the piston 50 and its interconnected piston 49 in such fashion as to force the liquid out of chamber 43 through outlet 42 to its ultimate destination. During this part of the operation air in the chamber 44 passes outwardly through passage 45.

Thereafter, air under pressure is introduced through passage 45 (which becomes the inlet port) moving the pistons 49 and 50 in the opposite direction whereupon liquids can again flow into chamber 43 through inlet 41. In this part of the operation air in the chamber 44 passes outwardly through passage 46. The above cycle is then sequentially repeated. Thus, chamber 44 serves as a double acting cylinder and piston 50 correspondingly serves as a double acting piston for actuating piston 49.

According to the present invention, in the event of damage or wear to the seals 52 and 53, any liquid bypassing these seals will flow to and through passage 57 to the exterior of the valve housing. As a consequence, there is a visual indication of fluid leakage because of damage to the seals. However, the fluid cannot pass into the actuating chamber 44 because of the presence of the seals 54 - 56. Thus, the seals 52 and 53 can be replaced before the liquid flows into the chamber 44 preserving the integrity of the air chamber.

While the invention has been described in detail with reference to specifc forms, it will be understood that such description is in no way intended to limit the scope of the invention as set forth in the appended claims.

What is claimed is:

1. Valve construction comprising:
    actuating means,
    a valve body having a fluid inlet passage and a fluid outlet passage, a valve seat between said inlet and outlet passages and a bore above the valve seat,
    a valve flow control plunger operatively arranged between the actuating means and the valve seat and extending through the bore in the valve body in substantially continuous slidable relation therewith and responsive to the actuating means for movement relative to the valve seat for correspondingly controlling fluid flow through the valve seat from the inlet passage to the outlet passage,
    spaced apart first and secnd sealing means correspondingly situated in the vicinity of each end portion of the bore for sealing against fluid flow through and bore to the actuating means, the second sealing means sealing against fluid flow along the plunger within the bore beyond the first sealing means, and
    a leak detection and relief passage extending from the interior of the valve body outwardly to the exterior thereof and located between the first and second sealing means and communicating directly with the bore for the flow of any fluid leaking past the first sealing means to a visible location outside of the valve body, the valve body being integral in the portion thereof between the first and second sealing means which extends outwardly from the bore and in which the leak detection and relief passage communicates with the bore.

2. Valve construction according to claim 1 wherein the first sealing means is a replaceable seal packing between the plunger and the valve body and the second sealing means is a diaphragm secured between the plunger and the valve body.

3. Valve construction according to claim 1 wherein spring means are provided for normally biasing the plunger toward operative sealing engagement with the valve seat, and the actuating means include a solenoid having a coil operatively surrounding the plunger for moving the plunger away from the valve seat against the biasing action of the spring means.

4. Valve construction comprising:
actuating means including a solenoid having an axially extending coil,
a valve body having a fluid inlet passage and a fluid outlet passage, a valve seat between said inlet and outlet passages and a bore axially extending above the valve seat,
a valve control plunger operatively arranged between the actuating means and he valve seat and axially extending through the bore in the valve body in substantially continuous slidable relation therewith, the plunger being normally resiliently biased toward operative sealing engagement with the valve seat and the coil of the solenoid operatively surrounding the plunger for moving the plunger away from the valve seat against such normal resilient bias whereby the plunger is responsive to the actuating means for movement relative to the valve seat for correspondingly controlling fluid flow through the valve seat from the inlet passage to the outlet passage,
axially spaced apart first and second sealing means correspondingly situated in the vicinity of each end portion of the bore for sealing against fluid flow through the bore to the actuating means, said first sealing means being in the form of a replaceable seal packing between the plunger and the valve body in the vicinity of the end portion of the bore axially adjacent the valve seat and the second sealing means being in the form of a diaphragm secured between the plunger and the valve body in the vicinity of the end portion of the bore axially remote from the valve seat, the diaphragm sealing against fluid flow along the plunger axially beyond the replaceable seal packing in the direction of the actuating means, and
a leak detection and relief passage extending substantially crosswise of the axial direction of the plunger from the interior of the valve body outwardly to the exterior thereof and located axially between the replaceable seat packing and diaphragm and communicating directly with the bore for the flow of any fluid leaking past the replaceable seal packing to a visible location outside of the valve body.

* * * * *